United States Patent
Eick et al.

(10) Patent No.: US 9,170,343 B2
(45) Date of Patent: Oct. 27, 2015

(54) QUASI-IMPULSIVE DISPLACEMENT SOURCE

(71) Applicant: CONOCOPHILLIPS COMPANY, Houston, TX (US)

(72) Inventors: Peter M. Eick, Houston, TX (US); Joel D. Brewer, Houston, TX (US); Shan Shan, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 393 days.

(21) Appl. No.: 13/874,146

(22) Filed: Apr. 30, 2013

(65) Prior Publication Data

US 2013/0286779 A1    Oct. 31, 2013

Related U.S. Application Data

(60) Provisional application No. 61/640,411, filed on Apr. 30, 2012.

(51) Int. Cl.

| | |
|---|---|
| *G01V 1/155* | (2006.01) |
| *G01V 1/09* | (2006.01) |
| *G01V 1/145* | (2006.01) |
| *G01V 1/24* | (2006.01) |

(52) U.S. Cl.
CPC . *G01V 1/145* (2013.01); *G01V 1/24* (2013.01)

(58) Field of Classification Search
CPC ....... G01V 1/09; G01V 1/143; G01V 1/1047; G01V 1/147; G01V 1/145; G01V 1/155
USPC ......................................... 181/111, 114, 121
See application file for complete search history.

(56) References Cited

U.S. PATENT DOCUMENTS

| | | | | |
|---|---|---|---|---|
| 2,675,882 | A * | 4/1954 | Bazzoni et al. | 181/111 |
| 3,777,843 | A * | 12/1973 | Fair et al. | 181/114 |
| 4,114,722 | A * | 9/1978 | Weber et al. | 181/114 |
| 4,133,409 | A * | 1/1979 | Mifsud et al. | 181/114 |
| 4,372,420 | A * | 2/1983 | White | 181/120 |
| 4,458,777 | A * | 7/1984 | Weber et al. | 181/121 |
| 4,651,044 | A * | 3/1987 | Kompanek | 310/323.17 |
| 4,853,906 | A * | 8/1989 | Cole | 367/189 |
| 5,614,670 | A * | 3/1997 | Nazarian et al. | 73/146 |
| 7,330,401 | B2 | 2/2008 | Jeffryes et al. | |
| 7,657,350 | B2 * | 2/2010 | Moran | 701/22 |
| 7,668,262 | B2 | 2/2010 | Woo et al. | |
| 7,841,444 | B2 * | 11/2010 | Cannell et al. | 181/121 |
| 8,256,565 | B2 * | 9/2012 | Pabon et al. | 181/104 |

(Continued)

*Primary Examiner* — Ari M Diacou
(74) *Attorney, Agent, or Firm* — ConocoPhillips Company

(57) ABSTRACT

The invention is an electric seismic vibrator source of the type used in seismic prospecting for hydrocarbons that creates a quasi-impulsive burst of seismic energy onto the ground and into the earth. The source uses an engine and generator combination to create electric power for all systems on the source such as driving a frame of linear electric motors that direct a rod or piston to contact the ground. All of the linear electric motors are driven against the ground in a high power pulse that delivers a band-limited spectrum of seismic energy over a very brief period of time that would like a "pop" and be measured in milliseconds. A quasi-impulsive seismic pulse would create a wave field that resembles the seismic data acquired using dynamite or other explosive seismic systems without the ultrahigh frequencies of a true explosive pulse. The quick burst or several quick bursts may further speed up the survey by minimizing the time that a vibe spends on a source point.

4 Claims, 2 Drawing Sheets

(56) References Cited

U.S. PATENT DOCUMENTS

| | | | |
|---|---|---|---|
| 2003/0168277 A1* | 9/2003 | Hopperstad et al. | 181/111 |
| 2006/0250891 A1 | 11/2006 | Krohn | |
| 2010/0232260 A1* | 9/2010 | Zowarka et al. | 367/189 |
| 2011/0209940 A1* | 9/2011 | Daraio | 181/139 |
| 2012/0037444 A1* | 2/2012 | Eick et al. | 181/114 |
| 2013/0155817 A1* | 6/2013 | Kim | 367/189 |

\* cited by examiner

QUASI-IMPULSIVE DISPLACEMENT SOURCE

CROSS-REFERENCE TO RELATED APPLICATIONS

This application is a non-provisional application which claims benefit under 35 USC §119(e) to U.S. Provisional Application Ser. No. 61/640,411 filed Apr. 30, 2012, entitled "QUASI-IMPULSIVE DISPLACEMENT SOURCE," which is incorporated herein in its entirety.

STATEMENT REGARDING FEDERALLY SPONSORED RESEARCH

None.

FIELD OF THE INVENTION

This invention relates to vibratory seismic sources and particularly to seismic sources that are held to the ground to deliver vibratory impulses into the earth for seismic prospecting of hydrocarbons and other subsurface resources.

BACKGROUND OF THE INVENTION

In the process of acquiring seismic data, seismic energy is delivered into the earth. Over the years, the preferred attributes of the seismic energy delivered into the earth have been honed to include a broad spectrum of wavelengths and sufficient power across the spectrum to be recorded at the surface. In general, a suitable land source must be able to deliver seismic energy waves in a spectrum of wavelengths from about 8 Hz up to 60-80 Hz. The source must have sufficient power across the spectrum so that the seismic waves have measurable amplitude at the surface after transiting deep into the earth, reflecting from or refracting through layers in the earth and transiting back to the surface. A last major characteristic of a desirable seismic source is that the energy from the source is distinguishable in the data record from seismic energy from other sources whether from background sources or other seismic prospecting.

Explosive charges have long been used as seismic sources although the intense release of energy is typically not permitted except in remote locations. Explosive sources, however, provide a wide array of wavelengths with considerable power across the wavelengths.

Hydraulic reciprocating seismic vibrators or vibes have been in use for many years using a baseplate connected to hydraulic rams that cause a reaction mass to reciprocate up and down to shake the ground through the baseplate. The hydraulic rams are operated to move the reaction mass through a sweep of the desired frequencies. However, the hydraulic systems are limited in their ability to provide sufficient power at high frequencies due to limitations of hydraulic flow in and out of the hydraulic cylinders. At very high hydraulic velocities, the hydraulic fluid is subject to cavitation effects when reversing directions that limits the amplitude of the movement of the reaction mass and thus the energy input in to the earth. At low frequencies, it is difficult for the hydraulic vibe to have enough travel to generate a low frequency wave into the ground. For example, consider how one would generate a one Hz wave with a hydraulic vibe. A very long throw of the reaction mass is needed to generate that wavelet because the mass has to be moving down and up the full one second.

BRIEF SUMMARY OF THE DISCLOSURE

The invention more particularly relates to a process for delivering a quasi-impulsive impact of band limited spectrum for a seismic prospecting operation wherein an electrically powered seismic source is provided that has a plurality of linear electric motors where a ground contact element of the linear electric motor is provided in proximity with the ground. The ground contact elements of linear electric motors are driven in a coordinated impulse against the ground to deliver a single impulse against the ground and convey seismic energy into the earth that include a broad frequency spectrum for seismically illuminating geophysical structures.

"Generally vertical" or "generally vertically" should be interpreted as meaning "with an axis of movement sufficiently nearly vertical with respect to the ground so as effectively to impart energy to the ground." Normally, the axis of movement would be less than 20 degrees to vertical, or in another embodiment less than 10 degrees to vertical.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
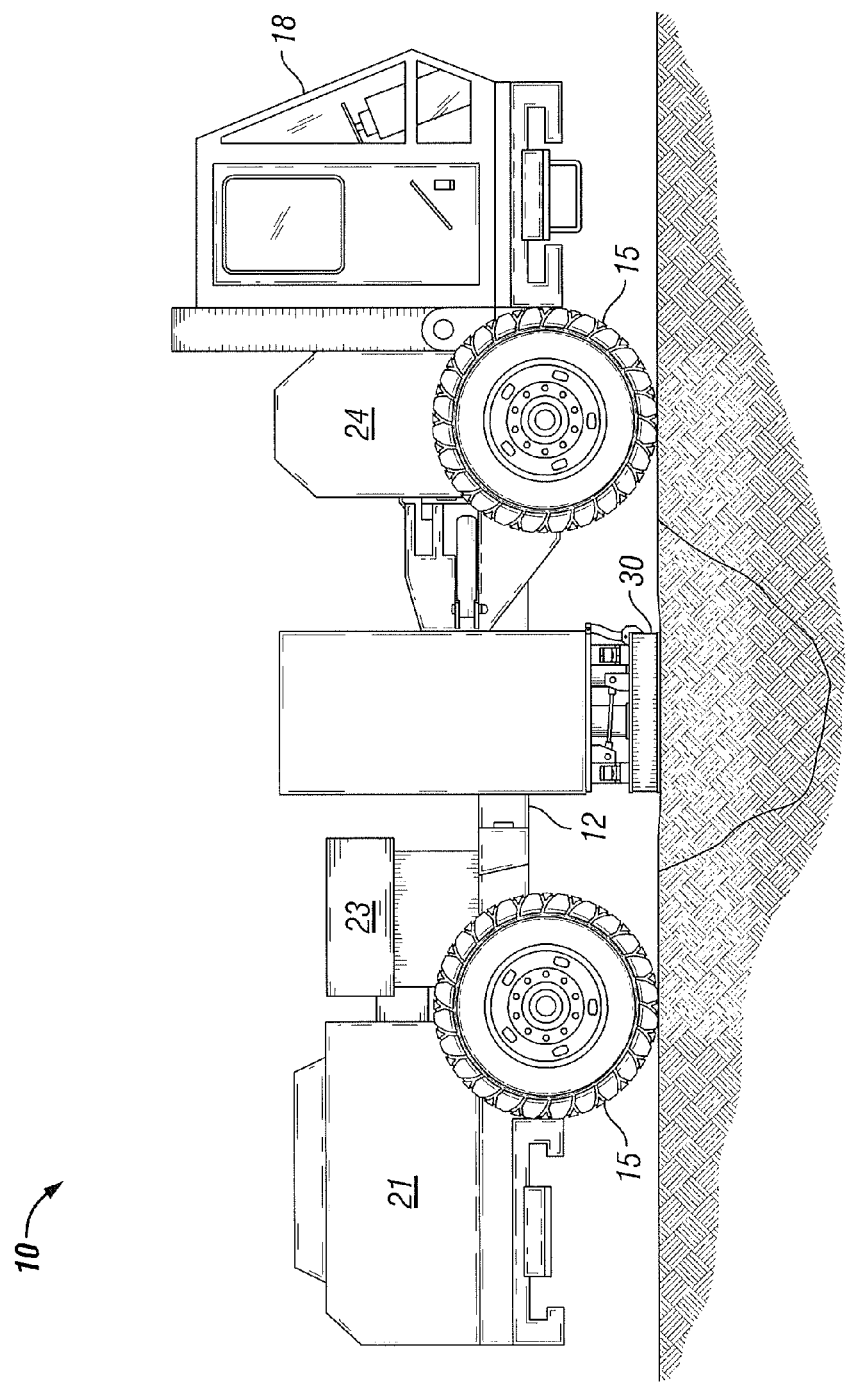
FIG. 1 is an elevation view of a discrete electric seismic source unit.

As shown in FIG. 1, an alternative vibrator actuator source 10 is shown comprising a chassis 12, four wheels 15 and a driver's cab 18. The alternative vibrator actuator source 10 uses a diesel engine 21 to turn an electric generator 23 and uses electric power to power the source 10 both for delivering acoustic energy into the ground and for moving along the ground from location to location. The source 10 utilizes electricity for all of its power needs. A large battery 24 is included to store energy for high situations of high electrical demand or when there are problems with the generator 23, but the battery 24 provides the power to return to a location for repair.

Figure 2:
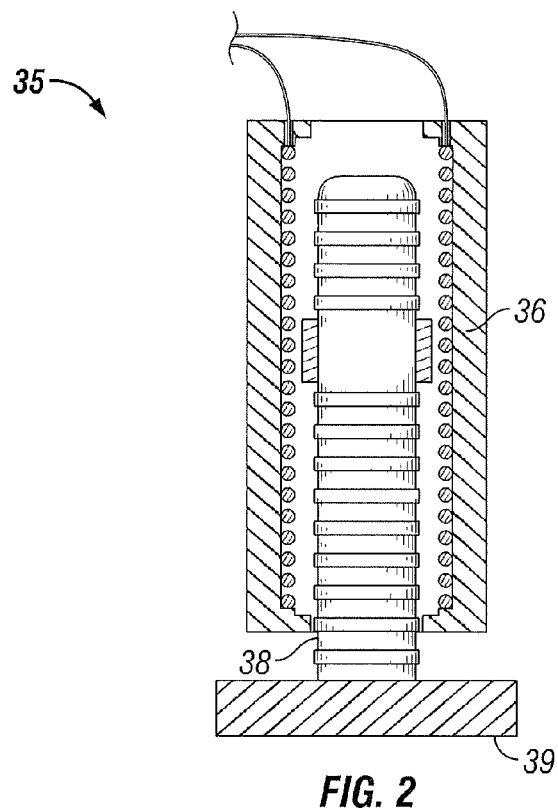
FIG. 2 is an enlarged fragmentary view of an electromechanical linear motor assembly for delivering seismic energy into the ground.
Figure 3:
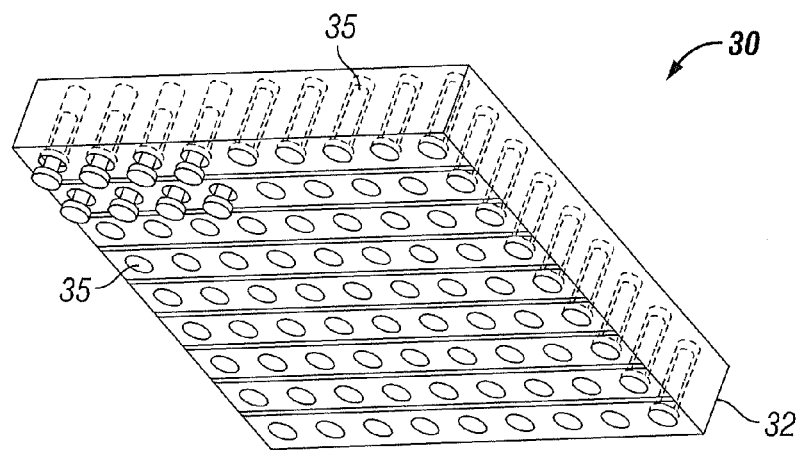
FIG. 3 is an enlarged perspective fragmentary view of a grid of electro mechanical linear motor assemblies for cooperatively delivering seismic energy into the ground.

Referring now to FIGS. 2 and 3, the acoustic energy delivery system 30 is carried under the chassis 12 and comprises a frame 32 that carries a number of linear motors 35. Each linear electric motor 35 includes a tubular body 36 and a rod or actuation bar 38 positioned within the tubular body 36 that extends telescopically from the lower end of the tubular body 36. A replaceable foot 39 is attached to the bottom end of the rod 38 for contacting the ground. The frame 32 includes mounts for a grid of linear motors 35. In the preferred embodiment approximately 112 linear motors 35 are arranged in a grid of perhaps 8 by 14.

In operation, the frame 32 is lowered into proximity to the ground G and the linear motors 35 are operated to lower the replaceable feet 39 into contact with the ground G. Once all of the replaceable feet 39 are in contact with the ground G, the linear motors 35 are activated to thrust the rods 38 toward the ground G and deflect the ground G and thereby deliver an impulse into the earth. The linear motors 35 are quickly operated to recoil the rods 38 without disengaging contact with the ground G by the replaceable feet 39. By successive thrusts and recoils, a pattern of acoustic energy is effectively delivered into the earth while the feet remain in contact with the ground G. It should be noted that the undulations and irregularities of the ground G may be accommodated avoiding decoupling across the dimension of the frame 32. This method may be arranged to automatically compensate for surface topographic variations along with soft and hard spots on the ground surface like rocks or logs. While it is recognized that ground typically does not deflect much, it does not take much deflection with a 60,000 pound vibrator holding the replaceable feet 39 to the ground G to deliver very useful acoustic energy. In this procedure, all of the linear motors 35 would be operated at the same time in the same direction using electrical power created by the electric generator 23 and supplemental battery 24 power if needed. The impulses would be repeated in a sequence where the impulse would occur with progressively increasing or decreasing rapidity such that a progression of frequencies of impulse forces would effectively deliver acoustic energy into the earth. The acoustic energy being characterizeable as a progressive pattern of frequencies covering a spectrum from about 1 Hz up to at least 80 Hz and preferably up to 120 Hz similar to a sweep.

An advantage of the preferred embodiment of the invention is that the impulses could be used a source in and of itself. The geophysically preferred source would be a pure spike of energy similar to an explosion of dynamite. The advantage of explosives like dynamite is the speed at which the energy is transferred from the source to the earth. Explosives transfer this energy very quickly which form the geophysically desired spike via physical movement of the earth's particles. Essentially, when a dynamite shot is fired it compresses the emit and also creates a void space due to the explosion both of which contribute to particle motion. While the preferred embodiment cannot create a perfect spike, the linear motors can transfer energy very quickly and because they are electrically driven, full power can be supplied instantaneously. This forms the quasi-impulsive spike of energy into the ground. The pulse is quasi-impulsive because the linear motor 35 can only move so fast and thus is band-limited. It should be noted that prior to delivering the impulse, the rod 38 is extended to put the foot 39 into contact with the ground. While this is preferred, it is not entirely necessary as the impulse may be accomplished with the rods 38 provided with space to punch the ground G.

The electric linear motors 35, working in conjunction, would not suffer the limitations of the hydraulic pumping systems at high frequency. Applying and reversing electric power instantly to the linear motors 35 causes movement of the rods 38 within the tubular bodies 36, and the impulse frequency range is greatly expanded. By using electrical control circuits that are commonly available for diesel electric train locomotives and hybrid cars, the power can be applied instantly with a very high degree of control and stabilization.

It should be recognized that higher frequencies than typically delivered may be achievable by the source 10. Perhaps frequencies as high as 200 Hz or higher may become useful in the field of seismic prospecting. There is no recognized reason that source 10 cannot deliver such high frequency acoustic energy into the ground G. In addition, it is generally understood that high frequency energy provides high resolution data. Unfortunately, high frequency energy attenuates in the earth more rapidly than low frequency energy. With a large number of linear electric motors, whether 2000, more than 2000 or less than 2000 like the example given of 112 motors, will be able to deliver high energy at high frequency. The size of the linear motors may be reduced or increased to adjust and adapt to ideal energy delivery system to create an optimal frequency range with high energy across the spectrum.

The selection of the specific linear motors is an engineering issue at production time because they can be sourced to have a large thrust force but with short strokes as compared to those that have longer strokes with less thrust, but higher speeds. As one embodiment of the invention, the frame 32 has approximately 112 linear motors 35 that are arranged in a grid of perhaps 8 by 14. Each linear motor is capable of outputting a peak acceleration force of approximately 2400 Newtons (N) or approximately 540 pounds-force while using 34 amps RMS (Arms) at 240 volts AC. The 112 linear motors would then be capable of outputting 268,800 N or 60,480 pounds-force using approximately 914 kilowatts of power. An array of 112 of these motors could operate in the space provided and would require approximately a 1225 Hp diesel electric motor and generator providing the prime mover power source assuming reasonable losses in energy conversion.

One advantage of using a plurality of linear electric motors as proposed by the present invention is that other operational modes may become available and useful. For example, while the operational description above described providing an impulse, a pure impulsive type displacement comparable to an explosive force may actually be possible. Explosives don't sweep but provide all the energy in a single pop that includes a broad spectrum of wavelengths within the energy impulse. In the preferred embodiment of the invention a large plurality of linear electric motors deliver energy over a short duration that would be a band-limited pulse so, in effect, the pulse would be a quasi-impulsive impact. However, the dynamics of moving the rods 38 under electric power provide options that a hydraulic system of current design would not be able to deliver the instantaneous energy impact.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for delivering a quasi-impulsive impact of band limited spectrum for a seismic prospecting operation, the process comprising:
   a) providing an electrically powered seismic source having about 100 to 5,000 linear electric motors carried by a frame, wherein a ground contact element of the linear electric motor is provided in proximity with the ground; and
   b) driving the ground contact elements of linear electric motors in a coordinated impulse against the ground to deliver a single impulse against the ground and convey seismic energy into the earth that include a broad frequency spectrum for seismically illuminating geophysical structures.

2. The process for delivering acoustic energy into the earth according to claim 1, further including the step of receiving and recording the seismic energy returning to the surface of the earth.

3. The process for delivering acoustic energy into the earth according to claim 1, wherein the step of driving the ground contact elements of the linear electric motors comprises driving the ground contact elements against the ground for at least 2 ms and no more than 12 ms.

4. The process for delivering acoustic energy into the earth according to claim 1, wherein the step of providing the ground contact element in proximity with the ground more particularly comprises providing the ground contact element into contact with the ground prior to driving the ground contact element against the ground to deliver the impulse.

* * * * *